Figure 1:
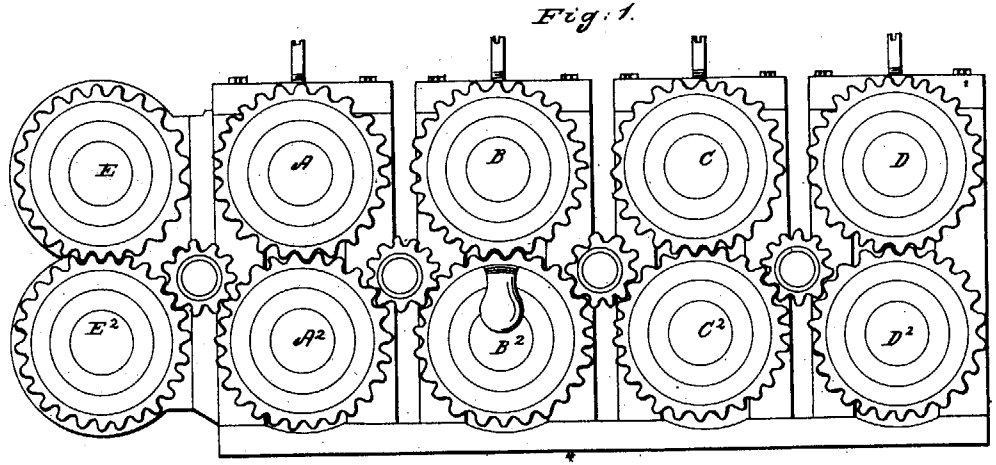

2 Sheets—Sheet 1.

BURT & HEDDEN.

Machine for Making Hames.

No. 644. Reissued Jan'y 4, 1859.

Witnesses:

J. Burnett Hyde.

A. M. Hyde.

Inventors:

Henry Burt.

Jas. T. Hedden.

N. PETERS, Photo-Lithographer, Washington, D. C.

2 Sheets—Sheet 2.

BURT & HEDDEN.

Machine for Making Hames.

No. 644. Reissued Jan'y 4, 1859.

Witnesses:

J. Burrow Hyde.

A. M. Hyde.

Inventors:

Henry Burt.

Jas. T. Hedden.

N. PETERS, Photo-Lithographer, Washington, D. C.

UNITED STATES PATENT OFFICE.

HENRY BURT AND JAMES T. HEDDEN, OF NEWARK, NEW JERSEY.

IMPROVED MACHINE FOR MAKING HAMES.

Specification forming part of Letters Patent No. 16,638, dated February 17, 1857; Reissue No. 611, dated January 4, 1859.

*To all whom it may concern:*

Be it known that we, HENRY BURT and JAMES T. HEDDEN, of the city of Newark, county of Essex, and State of New Jersey, have invented certain new and useful Improvements in Machinery or Apparatus for Forging and Shaping Metals; and we hereby declare the following to be a full and correct description thereof, reference being had to the drawings and model deposited with our original patent as granted February 17, 1857, but which we this day surrender for renewal.

The nature of our invention consists in the employment of a combined series of pairs of rollers of iron or other proper material having the peripheries of each pair cylindrical and parallel and firmly impinging together, so as not to admit the passage of any substance between them. Into these surfaces we cut out detached portions, representing the reverse of the figures or shapes to be forged as dies, into which the pieces of metal are to be pressed separately, the intervening spaces or surface of the roll being left plain, the cut-out portions or segments only forming the working part of the rolls; and we so cut out such portions of the rolls that, as the pieces of metal pass through the rolls, they shall be shaped progressively from the rough state in the first pair of rolls to the finished state in the last pair of rolls. In some cases we cut the figures in each roll of a pair representing the two sides of the article to be made, and in others, where one side of the article to be made is plain, we cut the figures entirely in one roll, leaving the other roll plain; and in some cases we cut the metal into pieces of suitable size and substance for the article to be made, but generally we provide the first pair of rolls with cutters, to sever the bar in proper lengths in the dies or recesses, as the rolls rotate; and to insure the proper entrance of the pieces into the dies of each successive pair of rolls, we employ guides between each set of rolls to conduct the piece to its proper place, and also to prevent its falling between the rolls.

We are aware that more than one pair of rolls have been used with their working surfaces cut away around the entire roll in grooves and other shapes for progressively (in one machine) reducing bars of metal as it passes through its whole length continuously and in the entire rotation between the rolls, which cannot be done with our machine.

In our machine the number of sets of rolls depends upon the nature of the article to be made, but in general cases we prefer five sets of rolls, the bearings of which are all firmly secured to one frame or bed, and all of which rolls are driven by a spur-wheel attached to a projecting end of one roll, which has upon it a smaller spur-wheel taking into and rotating a similar wheel upon the fellow-roll, each pair of rolls being provided with similar driving spur-wheels or pinions, which motion is communicated to one and another of the sets of rolls from the prime mover through the agency of single intermediate spur-wheels properly attached to the frame between the rolls, so that all the rolls are made to rotate simultaneously and take the work consecutively in its progress from the first pair of rolls to the last, as it passes to completion through the machine, the material being guided from one set of rolls to the other through the agency of the conducting-guides between the pairs of rolls, and so adjusted as to receive the piece and convey it to its proper position in the next pair of rolls, and so on to the last pair of rolls, thus making our apparatus an automatic forging or shaping machine. In cases where the surface to be shaped and the size or weight of the metal to be worked be not too large or too heavy, we employ as the working-surface of the rolls cylinders of suitable material to be slipped around or upon the roll-shafts and keyed thereto, upon which cylindrical surfaces are cut out, as before described, for the working-dies. The use of these cylinders, when they can be employed for light work, will greatly economize the expense of the machine where a variety of shapes are to be forged.

In the employment of our machine we proceed as follows: If the material to be shaped is iron, a furnace of proper size and form convenient to the machine is requisite for heating the iron to a workable state. From this furnace we place the metal between the first pair of rolls, either in the bar to be cut by the machine or cut into pieces, as before stated, and it will traverse the machine without further aid and be delivered in proper shape, and when the metal is softer than iron the heating is dispensed with.

Figure 3:
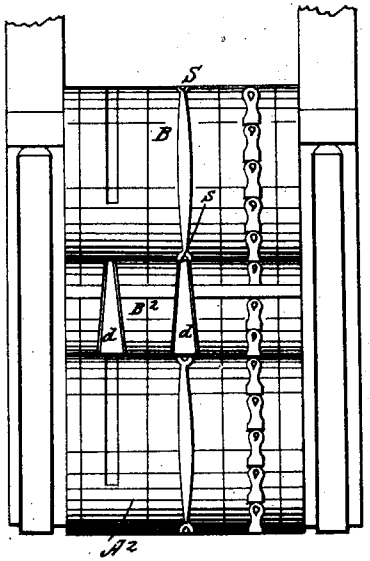
Figure 2:
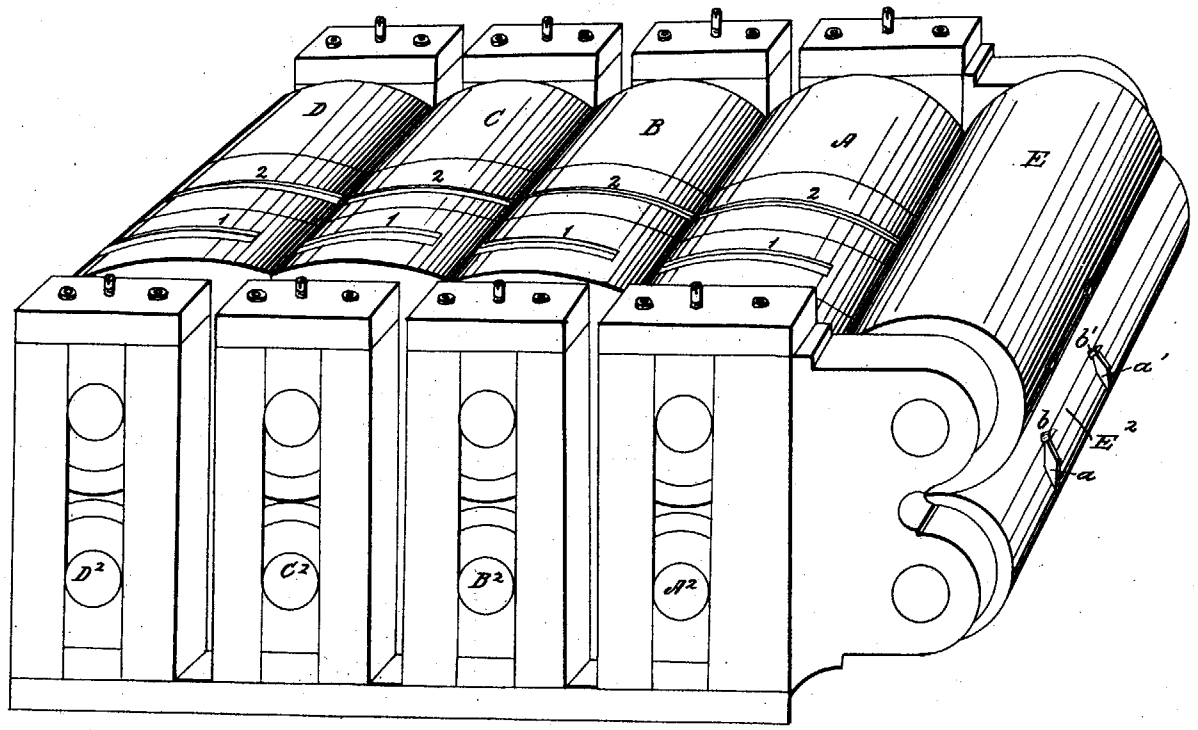

In the drawings the several parts in Figs. 1, 2, and 3 are represented by similar letters.

A, B, C, and D and $A^2$, $B^2$, $C^2$, and $D^2$ represent the shaping-rolls, with the cut-out portions, 1 and 2 and $2^2$.

E and $E^2$ represent the first pair or feed rollers, with the preparing-dies *a* and $a^2$, and the stops or cutters *b* and $b^2$, which cutters take into a recess, *s*, in the fellow-roll E.

*d d* represent, in Fig. 3, the guides between the rolls for receiving and delivering the work in its several progressive stages from one pair of rolls to another.

What we claim, and wish to secure by Letters Patent, is—

The forging of metal into useful forms by the employment of two or more pairs of rolls having their surfaces cut away, as described, and combined and rotating and pressing the metal progressively into shape, as described, being conducted from one pair of rolls to another through the agency of the guides, substantially as described.

HENRY BURT.
J. T. HEDDEN.

Witnesses:
J. B. HYDE,
A. M. HYDE.